United States Patent [19]

Agui et al.

[11] 4,334,274

[45] Jun. 8, 1982

[54] METHOD OF DETERMINING WHETHER OR NOT A REGION IN A PICTURE IS WITHIN A CLOSED BOUNDARY, AND AN APPARATUS THEREFOR

[75] Inventors: Takesi Agui; Masayuki Nakajima, both of Yokohama; Koichi Iwata, Shizuoka, all of Japan

[73] Assignee: Kopia Kabushiki Kaisha, Tokyo, Japan

[21] Appl. No.: 42,309

[22] Filed: May 25, 1979

[30] Foreign Application Priority Data

Jul. 7, 1978 [JP] Japan .................. 53-082554

[51] Int. Cl.³ .............................................. H04N 1/40
[52] U.S. Cl. ................................. 364/515; 358/284
[58] Field of Search ............... 364/515, 518, 520, 521, 364/523, 526; 358/166, 260, 284; 355/4, 5, 7; 340/723, 729, 750, 789, 793

[56] References Cited

U.S. PATENT DOCUMENTS

| | | | |
|---|---|---|---|
| 2,962,550 | 1/1960 | Brink | 358/284 |
| 4,127,873 | 11/1978 | Katagi | 358/138 |
| 4,150,400 | 4/1979 | Wong | 358/260 |

OTHER PUBLICATIONS

Appel et al.; "Automatic filling of Bounded Areas in a Raster Display"; IBM Tech. Discl. Bull.; vol. 21, No. 3; Avl. 1978; pp. 1300-1303.

Stucki; "Optimal Digital Halftone Pattern Generation Method"; IBM Tech. Discl. Bull.; vol. 17, No. 9, Feb. 1975; pp. 2779-2780.

Primary Examiner—Errol A. Krass
Attorney, Agent, or Firm—Robert E. Burns; Emmanuel J. Lobato; Bruce L. Adams

[57] ABSTRACT

A given picture is scanned to store picture cell data thereof into memory positions of a first memory device. Non-boundary signs are written into a second memory device at its memory positions corresponding to the memory positions, filled by the picture cell data, of the first memory device. Coordinate values of the boundary picture cell data in the first memory device are produced. Then, discrimination signs are obtained by comparing the coordinate values, and are written into the second memory device at the memory positions corresponding to the picture cells on the closed boundary. The discrimination signs stored in the second memory device are checked to determine whether each of the non-boundary signs corresponds to picture cell data inside or outside of the closed boundary.

1 Claim, 30 Drawing Figures

FIG. 6
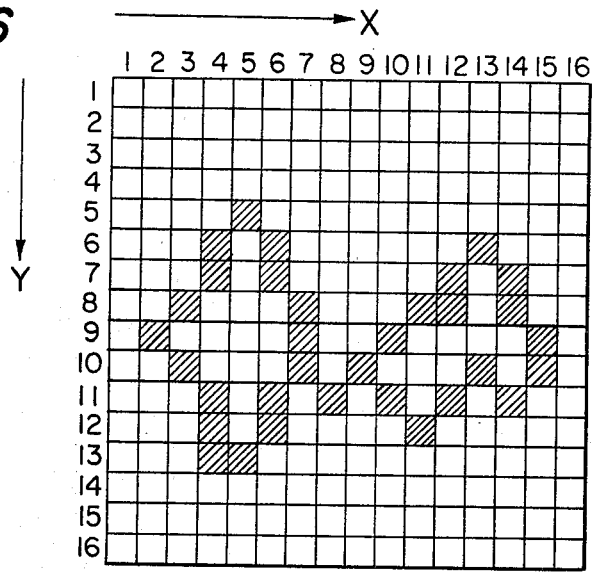
FIG. 7
FIG. 8
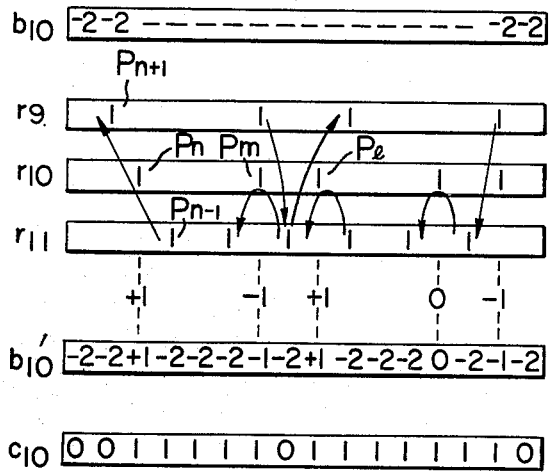

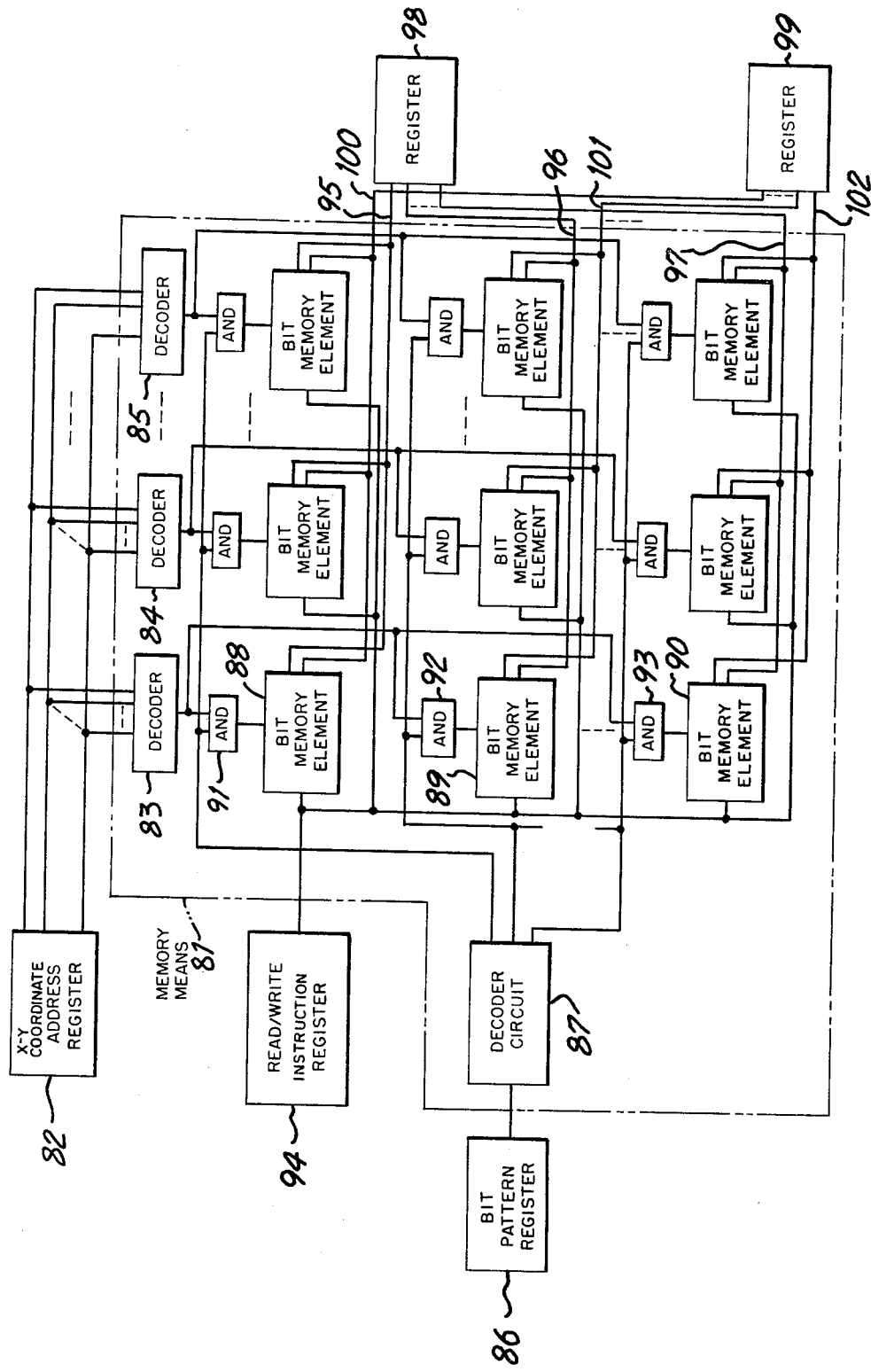

METHOD OF DETERMINING WHETHER OR NOT A REGION IN A PICTURE IS WITHIN A CLOSED BOUNDARY, AND AN APPARATUS THEREFOR

BACKGROUND OF THE INVENTION

This invention relates to a method of determining whether or not a region in a given picture is within a closed boundary.

It is very important to determine whether or not a picture cell of a given picture is within a closed boundary, in order to for example, compute the area of the closed region and on the same line. According to one of the conventional methods of determining or extracting the picture cells within the closed region the picture cells located on each scanning line and aligned between two boundary points are filled one by one with reference to connectivity of the picture cells on the boundary. A disclosure of such a prior art is found in, for example, A. Rosenfeld, "Picture Processing by Computer" Academic Press [1969].

Such prior art requires a considerable memory capacity for storing the lists indicating the connectivity of the boundary points, and also requires complicated programming as well as a relatively long processing time. More specifically, according to the prior art in question, the stored picture information is first read out line by line, and second, as each line is read out, the boundary points of the read-out line are searched with reference to the connectivity list. Then the picture cells between the detected boundary points are filled. Therefore requiring the large capacity memory and complicated programming etc, as previously mentioned.

Furthermore according to the prior art, it is impossible to analyze an island, viz., a region which is enclosed by a closed boundary and which has no connectivity therewith.

SUMMARY OF THE INVENTION

A given picture is scanned to store picture cell data thereof into memory positions of a first memory device. Non-boundary signs are stored into memory positions of a second memory device. The non-boundary signs each indicates that the corresponding picture cell is not located on the closed boundary of the given picture, and the memory positions of the second memory device correspond to the memory positions, filled by the picture cell data, of the first memory device respectively. The picture cell data representative of the picture cells on a closed boundary of the given picture are followed along a predetermined direction to obtain coordinate values of the boundary picture cell data. Coordinate values of a preceding and next successive boundary picture cell of each boundary picture cell data are compared along a first coordinate axis. Then, discrimination signs are produced each of which is indicative of increasing, decreasing or lack of change of the compared coordinate values. The discrimination signs are written into the second memory device at the memory positions corresponding to the picture cells on the closed boundary. The discrimination signs are checked along a second coordinate axis, which intersects the first coordinate axis, to determine whether each of the non-boundary signs correspond to picture cell data inside or outside of the closed boundary.

BRIEF DESCRIPTION OF THE DRAWINGS

Details of the invention, and of preferred embodiments thereof, will be further understood upon reference to the drawings wherein:

FIG. 6 shows a picture cell arrangement for illustrating a method, embodying this invention, of determining whether a region in a picture is within a closed boundary;

FIG. 7 shows digitized intensity information of some picture cells shown in FIG. 6;

FIG. 8 is a schematic drawing useful in explaining a method embodying this invention;

FIG. 19 is a block diagram exemplifying a memory device, embodying this invention, into which information can be read and written with respect to each bit.

DESCRIPTION OF THE PREFERRED EMBODIMENTS

In the following, a conventional method will be referred to and thereafter a method and apparatus embodying this invention will be referred to in connection with the accompanying drawings.

Figure 1:
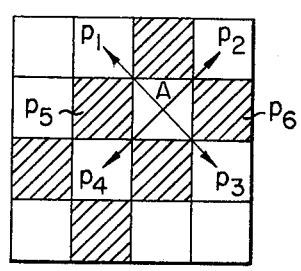
FIG. 1 is a schematic drawing of picture cell arrangement for showing the connectivity of picture cells in a picture.

FIG. 1 shows a binary picture illustrating connectivity of a picture cell, within a closed boundary, with its neighbors. It is assumed for simplicity that the binary picture of FIG. 1 consists of 4×4 picture cells. Black (or hatched) cells each is a boundary point and a cell A is surrounded by black cells. However, the white cell A has connectivity with the white cells P1 through P3 outside the closed boundary, and also with the white cell P4 within the closed boundary, so that it is impossible for the connectivity alone to distinguish whether or not the cell A is within the closed region. In accordance with this invention, the determination whether any given cell is within a closed boundary is not based on the concept of connectivity so that any cell outside the closed boundary can be accurately defined as being outside or within it. More specifically, let us consider the row involving the cell A as for example, the row is scanned left-to-right so that the scanning encounters the cells P5, A and P6 in this order. Therefore, the problem inherent in the method according to the aforementioned concept of connectivity can be overcome.

Figure 2:
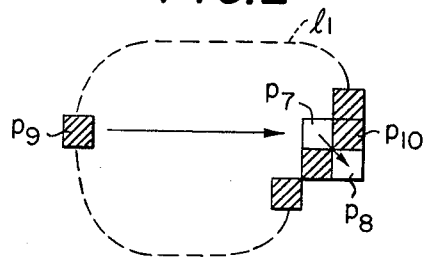
FIG. 2 is a schematic drawing for illustrating a conventional method of determining whether a region in a given picture is within a closed boundary.

If picture cells of the binary picture are determined to be within a closed boundary according to the concepts of connectivity as referred to in conjunction with FIG. 1, then in FIG. 2 the cell P8 tends to be mistaken as a point inside a closed boundary L1 in that the cell P8 also has connectivity with its neighbor P7. Therefore, it has been proposed heretofore in order to avoid such mistakes that the connectivity of the boundary points is first stored or memorized and then the cells within the closed boundary are colored or filled with reference to the stored connectivity. Such a technique is disclosed for example, in "Digital Picture Processing" Academic Press, 1979, by Rosenfeld & A. C. Kak, and Technical Report of Electronics Communication Association (picture engineering) "On coloring and Labeling of connected components" by Yasuhito SUENAGA. According to the above conventional method, information that the boundary points P9 and P10 belong to the same boundary L1 is previously stored in suitable memory means. Then, the region between the cells P9 and P10 is filled or colored for silhouette generation based on this information. However, the filling or coloring is very complicated if the area within the boundary further includes one or more closed boundaries. This is because the numerous boundary lists each indicating connectivity are required with the result that the making of the lists as well as the following filling are cumbersome and complicated. On the contrary, according to this invention, such equivalent boundary lists are not required, and the filling process is much easier relative to the aforementioned conventional methods.

Figure 3:
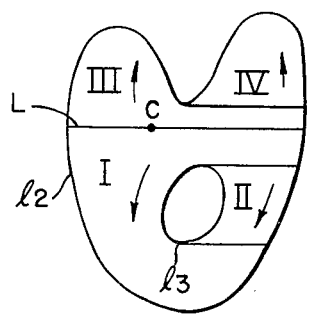
FIG. 3 is a schematic drawing for illustrating a conventional method of filling the region within a closed boundary.

According to the above mentioned prior art, the example of FIG. 3, in which the closed boundary L2 involves a background enclosing another boundary L3, requires very complicated filling. More specifically, the filling requires many steps: (1) a point c is initially singled out as a starting point, (2) an area I under a line L involving the starting point c is first filled left-to-right, top-to-bottom as indicated by an arrow (no numeral), and (3) the areas II, III and IV are filled in this order. This conventional method has inherently cumbersome procedures especially when the area inside the boundary L1 has complicated closed regions and backgrounds, in the case of which some lines are repeatedly filled until the completion of the filling.

Figure 4:
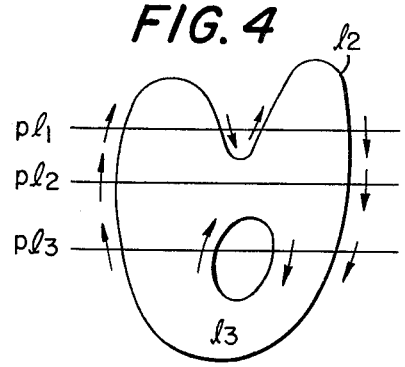
FIG. 4 is a schematic drawing for illustrating a method, embodying this invention, of determining whether a region in a picture is within a closed boundary.

On the contrary, according to this invention, the determination whether the picture cells are within the closed boundary is executed by checking directional codes indicating the directions of the boundary intersecting a horizontal scanning line. Therefore, since the aforementioned determination can be prosecuted independently of other scanning lines, the problem inherent in the conventional art can be removed. The method of this invention will be further discussed in connection with FIG. 4 which is a picture substantially identical to that of FIG. 3. Three scanning lines PL1, PL2 and PL3 intersect the closed boundary L2 and L3 and the direction of the boundary L2 and L3 relative to the scanning lines are stored independently of the other scanning lines. Arrows along the boundaries L2 and L3 indicate that the boundaries are followed clockwise.

There is a more complex example where the boundary has a thickness consisting of more than two picture cells, or where the outer boundary includes further one or more closed boundaries. In such an example, according to this invention, the outermost boundary and its corresponding silhouette is first computed in both cases. Next, if the boundary has a thickness, the inner boundary of the area having the thickness and its silhouette is extracted. On the other hand, in the case of the latter, i.e., where the outer boundary further includes one or more closed boundaries, the inner boundary and its corresponding silhouette is computed and thereafter another inner boundary and its corresponding silhouette is computed if any. If the area within the outermost boundary is composed of multiple closed boundaries, then the above steps are repeated until the innermost closed region is extracted. Thus, according to this invention, the region extraction can be effectively prosecuted even if one or more islands are enclosed by the closed boundary.

Figure 5:
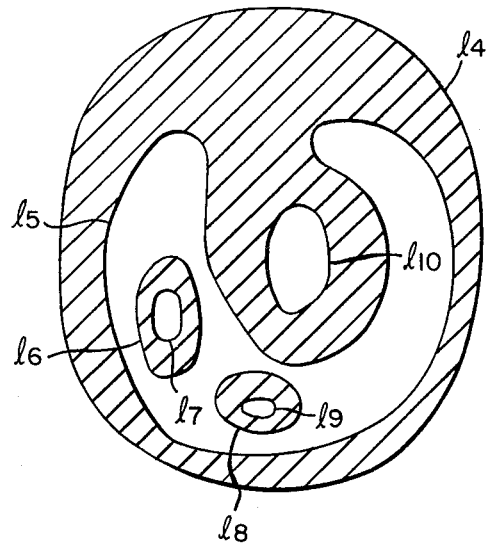
FIG. 5 is a schematic drawing for illustrating a method, embodying this invention, of determining whether a region in a picture is within a closed boundary, in the case where the closed boundary enclosed other closed boundaries.
Figure 9A:
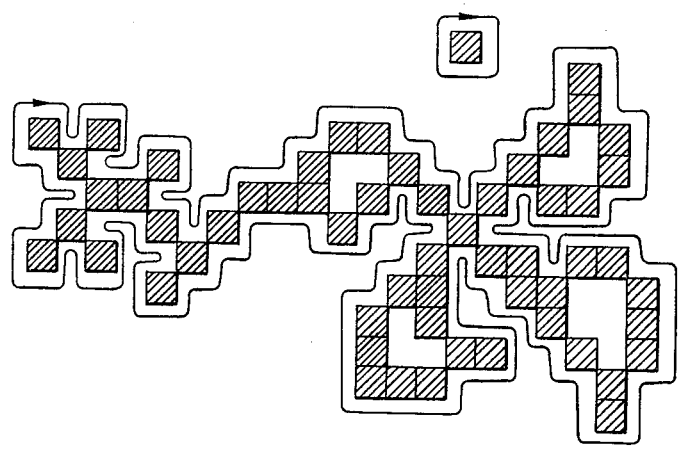
FIGS. 9(a) through (h) each is a schematic drawing for illustrating the relation between the closed boundary following and discrimination signs.
Figure 9B:
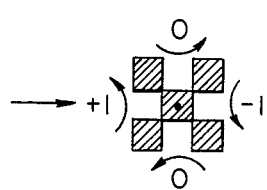
Figure 9C:
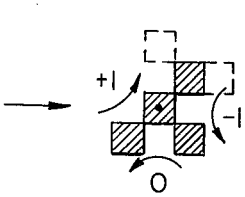
Figure 9D:
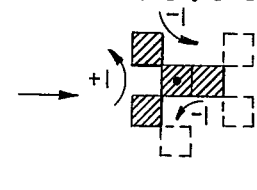
Figure 9E:
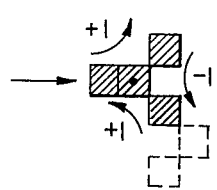
Figure 9F:
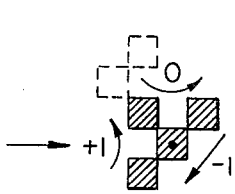
Figure 9G:
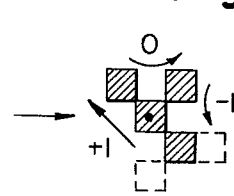
Figure 9H:
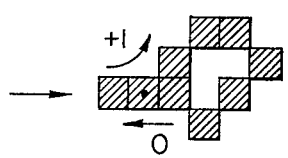

FIG. 5 illustrates the above discussed complex example wherein a closed thick boundary contains within itself a background. In FIG. 5, the hatched portions each indicates a closed thick boundary. According to this invention, the outermost boundary L4 and its corresponding silhouette is first determined or computed. Second, the area within the inner boundary L5 is checked to see whether it involves a white area or background. The checking is implemented by sequentially scanning the binary picture of FIG. 5, one horizontal end to the other, and top to bottom. If the area with L5 contains any background, the inner boundary L5 and its corresponding silhouette is then computed. Next, the area within the inner boundary L5 is checked to see whether a black area exists inside the area in question. In the case of FIG. 5, there exists the hatched area surrounded by L6 and L7, so that the outer boundary L6 and its corresponding silhouette is computed. Then, the area enclosed by the boundary L6 is checked whether a white area or background is involved. When the white area enclosed by a boundary L7 is checked, the area enclosed by L7 and its corresponding silhouette is computed. After completion of this computing, the area enclosed by the boundary L7 is further checked whether it contains a black area. In the example of FIG. 5, there is no black area within the boundary L7, the computing is transferred to the area enclosed by the boundary L8, and the above mentioned procedures are repeated until the area within the boundary L9 contains no black area. Then the area within the boundary L5 is further checked whether it contains any black area. If not, the searching inside the boundary L5 is completed. In this example, the area defined by the boundaries L4 and L5 involves a white area. When the area enclosed by a boundary L10 is found, the area and its corresponding silhouette is computed. Then, the area within L10 is checked whether it contains a black area. In this case, since there exists no black area within the boundary L10, so that the checking of the area enclosed by L10 is finished. Finally, the area defined by the boundaries L4 and L5 is further checked whether it contains any other white areas. If no white area is found except the area inside the boundary L10 then the above procedure is finally completed.

Summing up the above, once a closed boundary and its corresponding silhouette is determined or defined, then the area within the closed boundary is checked whether the area is filled with the same picture cells. The checking is carried out by counting the number of black cells (binary 1's) and white cells (binary 0's). By this checking, if it is found that the area in question contains one or more picture cells differing from the cells of the boundary, the following steps or procedures are implemented: the picture cell rows horizontally crossing the area are sequentially scanned one end to the other, top to bottom until the complemented cell is encountered, whereupon boundary following or tracing starts from the encountered point for determining or defining the previously detected boundary. Thereafter, again the closed boundary and its corresponding silhouette is defined, then the area within the inner closed boundary is checked whether the inner area is filled with the same picture cells. By way of the same in the case of checking as mentioned above if the inner area is found to contain one or more picture cells different from the cells on the inner boundary. The above procedures are repeated until all the cells inside the inner area are found to be identical. In the above procedure, in order to distinguish the checked closed area from the rest, viz., unfinished area, the picture cells already checked are complemented. The complementation is executed from the innermost closed region. As for the example of FIG. 5, when the checking of the area inside the boundary L7 is completed the corresponding cells therein are complemented from "0" to "1". Then all of the cells within the boundary L6 are converted from "1" to "0", and the same complementation is applied to the area within the boundary L9 and thereafter the area within L8. In the same manner the picture cells "0" enclosed by L5 are complemented to "1". Similarly, after the area within the boundary L10 is found to be filled with the same kind of cells, all of the cells within the L10 are changed from "0"s to "1"s.

As is previously discussed, the plurality of boundaries and their corresponding silhouettes are computed from the outermost to the innermost, and finally the outermost boundary and its corresponding silhouette is established.

In connection with the present invention the term "boundary" includes not only the outline of a black cell region (which may contain white cells) but also the outline of a white cell region (which may contain black cells).

As one of the applications of this invention, let us consider a positive photograph with a white background, wherein a black outermost closed line is searched and then its corresponding silhouette computed. Let us then further consider a negative photograph with a black background wherein a white outermost outline is searched and its corresponding silhouette computed.

FIGS. 6 through 8 are presented for illustrating the underlying principle of the method according to this invention, viz., the method of determining whether a region in a picture is within a closed boundary or not. FIG. 6 shows a picture with only two levels, viz. black and white cells. It will be assumed for simplicity that the picture cells of FIG. 6 are arranged in 16 rows and 16 columns in X- and Y-axes, respectively. Note that an actual picture has $256 \times 256$ or $1024 \times 1024$ cells, for example. The black cells each indicates a boundary point, and the white cells each indicates a point which does not belong to a boundary point. FIG. 7 shows, by way of example, three words (line information) a9, a10, a11 and all representing respective binary information of the 9th, 10th, and 11th rows of the picture of FIG. 6. The cell positions of the X-axis coordinate correspond to the bit positions of the words a9, a10 and a11, respectively, and the Y-axis position is stored in an address position of each word. The signs "1" and "0" indicate black and white cells, respectively.

The bit positions of the word b10 correspond to those of A10 of FIG. 8, respectively. All the bit positions of the word b10 are initially filled with a sign "$-2$" which indicates non-boundary point. The words r9, r10 and r11 of FIG. 8 correspond to the words a9, a10 and a11, respectively, except that the bits "0"s of the latter words are omitted. The arrows crossing the words r9, r10 and r11 indicate the directions of a boundary following when the closed boundary of FIG. 6 is followed clockwise. Let bit "1"s of the words r9, r10 and r11 be denoted by a P-plus-suffix. A point $Pn+1$ following a point $Pn$ on the word r10 is on the word r9, and a point $Pn-1$ preceeding a point $Pn$ is found on the word r11. The picture cells corresponding to the points $Pn+1$ and $Pn-1$ are on the 9th and 11th rows of Y-axis of FIG. 6. If the number of Y-axis corresponding to $Pn+1$ is subtracted from the number on Y-axis corresponding to $Pn-1$, then the result is negative. The negative result of the subtraction means that when the 10th row is scanned left to right, the scanning enters the region within the closed boundary at the currently considered point, viz., Pn. Therefore, the sign "$+1$", which indicates the above information, is written in the corresponding bit position of b10. The above mentioned subtraction will be further performed with respect to the other bit "1"s of the word r10, wherein the corresponding bit positions of b10 are changed by "0" and "$-1$" when the subtraction results are zero and positive, respectively. The positive result of the subtraction means that when the 10th row is scanned left to right, the scanning exits from the region within the closed boundary at the boundary point P1 on the same row. Let consider a boundary point Pm, the picture cell corresponding to the boundary point Pm is twice traced, in the case of which one of the substraction results along the Y-axis becomes positive. In general, in the case where one boundary point is multi-traced or scanned during boundary following, once the subtraction along the Y-axis is positive, then the corresponding position of b10 is changed to "$-1$" and maintained in the same state. This means that the scanning from left to right exits from the region enclosed with the closed boundary. The point P1 is twice traced as shown, but an increase in the Y-axis coordinate does not occur. In this case, the discrimination signs obtained by each tracing are logically ORed, and then its result is written onto the corresponding position of b10. Thus, the discrimination or directional signs are written on the word b10.

The final result of the word b10 is shown in the word b10'. In consideration of the aforementioned meanings of "+1", "0" and "−1", one may define which of the sign "−2"s are inside the closed boundaries. The contents of the word b10' is changed as shown in a word c10 where "1" and "0" indicate cells inside and outside the closed boundary, respectively.

FIG. 9 is for illustrating discrimination signs where the closed boundary is traced. FIG. 9a exemplifies a binary picture the boundary of which is followed along its outside in the direction as shown by an arrow, that is, clockwise. In this example, it is assumed that the closed boundary includes a point, straight and curved lines. In FIGS. 9b through 9h, several portions of the picture of FIG. 9a are shown together with both the tracing directions and their corresponding discriminating signs. In FIGS. 9b through 9h, the horizontal straight lines each having an arrow head indicates a scanning direction, arrow headed lines around the picture cells each indicates the boundary following direction. The signs "+1", "−1" and "0" are the discrimination signs representing the meaning of the directions of their neighboring arrows, respectively. FIG. 9b shows that one of the picture cells is traced four times, FIGS. 9c through 9g shows that one of the cells is traced three times, and FIG. 9h shows that one of the cells is traced or scanned two times, during the boundary following or scanning.

Figure 10:
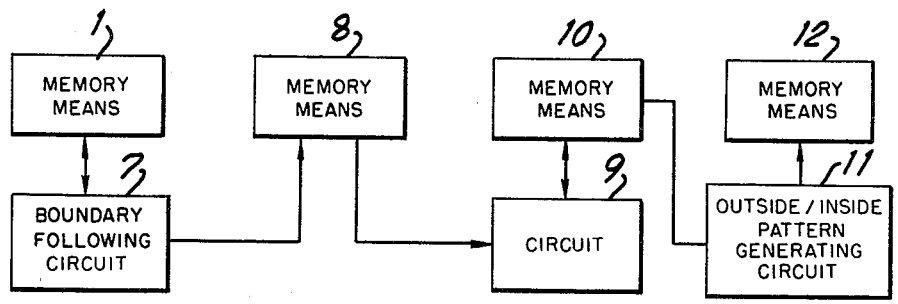
FIG. 10 is a block diagram for illustrating an overall arrangement of one example of the circuit embodying this invention.

FIG. 10 shows a block diagram of one example of apparatus embodying this invention, that is, apparatus for determining whether a region in a picture is within a closed boundary. Intensity values of the picture cells of a given picture are digitized and then stored in memory means 1 to form a plurality of words as exemplified in FIG. 7. The digitization and the storing can be carried out by using a conventional technique.

Figure 11:
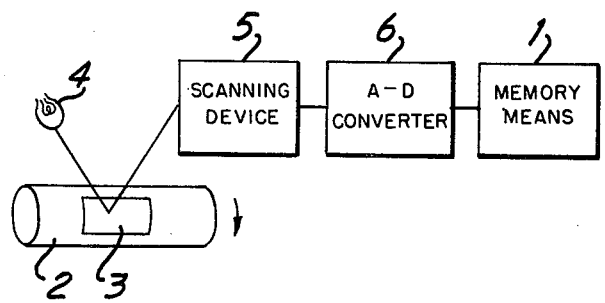
FIG. 11 is a schematic illustration for producing and storing the intensity information of a picture.
Figure 12:
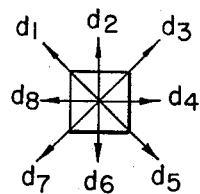
FIGS. 12 and 13 each is a schematic drawing for illustrating the boundary following of a closed boundary.
Figure 13:
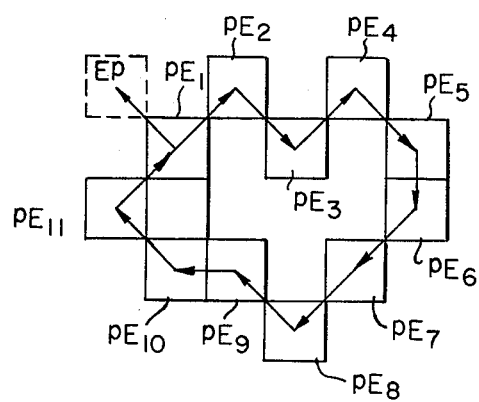

There are some conventional methods of storing the digitalized information derived from a given picture. By way of example, one of such methods is to synchronously digitize (or A/D convert) video outputs of a television camera and store the digital outputs in memory means. Another example is to digitize (or A/D convert) analog outputs which are photoelectrically converted using a mechanical scanner such as a drum scanner. FIG. 11 illustrates a method using the drum scanner. A suitable subject copy 3 is wrapped around a drum 2 which rotates in the direction as shown by an arrow and then is scanned by a scanning device 5 while the subject copy is subject to a light source 4. The output of the scanner 5 is fed to a A/D converter 6 to be digitized therein. Picture cell intensities in digital form are then stored in the memory means 1. A boundary following circuit 7 of FIG. 10 derives the digital boundary information from the memory means 1 and traces the picture cells along the boundary in a preselected direction such as clockwise for writing the locations of an X-Y coordinate of the boundary cells into another memory means 8. The boundary following can be implemented by using a known technique. As shown in FIG. 12, the neighbors of a black boundary cell are checked, until a black neighbor is found, starting from the neighbor d1 to d8 in a predetermined direction. When a neighboring black cell is first found, it will become the next considered black boundary cell, thereafter the same procedures are repeated. It goes without saying that if a white boundary should be followed, white neighboring cells are searched. FIG. 13 illustrates an example of a resultant boundary following according to the processes as shown in FIG. 12. In FIG. 13, the boundary following begins with the starting cell PE1 and the neighboring search is continued by sequentially changing the center cell from PE2, PE3, . . . in this order until a final cell EP is found. The reason why the position of the final cell EP is set to be different from that of the starting cell PE1 is to prevent the boundary searching from being undesirably terminated before completion, which may occur when the staring point PE1 is more than once traced. The boundary following circuit 7 performs the boundary following described in conjunction with FIG. 13 depending on the digitized picture information as shown in FIG. 7. In FIG. 13, the picture cells PE1 through PE11 are black cells when a black region is traced, and it is apparent that they are white cells when a white region is traced.

A discriminating sign generating circuit 9 writes non-boundary signs "−2" into memory positions of the memory means 10. The memory positions of the memory means 10 consist of words which correspond to the words of the memory means 1. The circuit 9 reads the coordinate values of the boundary points from the memory means 8, and generates the discriminating signs based on the processes as previously discussed in connection with FIG. 8, and thereafter writes the generated discriminating signs into corresponding memory positions of the memory means 10. Outside/inside pattern generating circuit 11 reads and searches each word of the memory means 10 from one side to the the other to determine whether the non-boundary signs involved are inside or outside the closed boundary.

The generating circuit 11 then produces line patterns one of which is exemplified by c10 in FIG. 8, based on the above mentioned determination, and writes the patterns into the memory means 12. The memory means 1, 8, 10 and 12 may be constructed of IC chips.

In the following, the circuit diagrams of the blocks of FIG. 10 will be exemplified.

Figure 14:
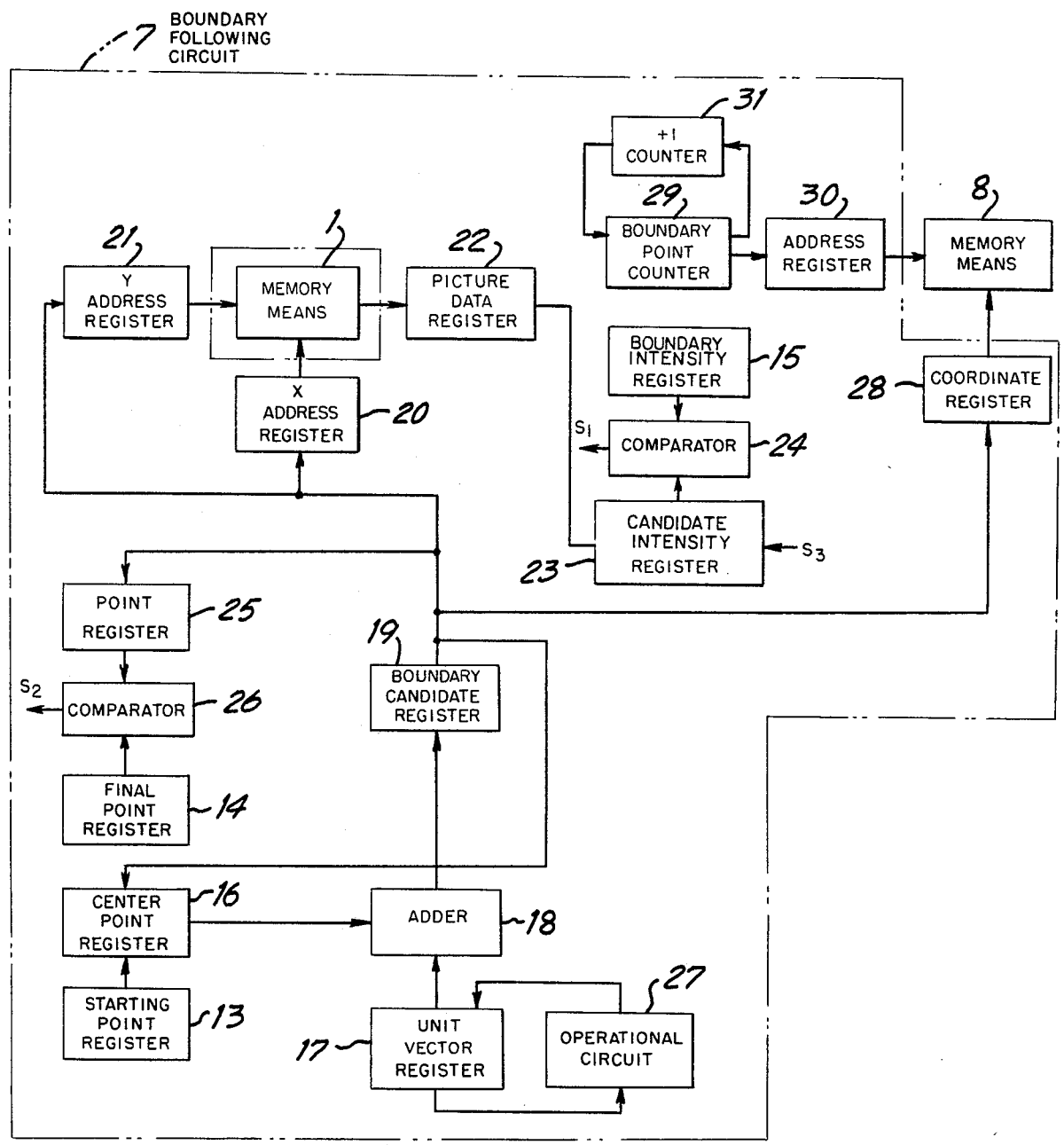
FIG. 14 is a block diagram exemplifying an embodiment of the boundary following circuit.

FIG. 14 illustrates one example of circuit configuration of the boundary following circuit 7.

Prior to the boundary following procedure, the value of the X and Y coordinates of the starting point, such as PE1 in FIG. 13, are set in a starting point register 13, and then the values of the X and Y coordinates of the final point, such as EP in FIG. 13, are set in a final point register 14. Furthermore the intensity flag of black or white to be traced is set in a boundary intensity register 15. Next, the content of the starting point register 13 is transferred to a center point register 16 and thereafter the contents of both the register 16 and a unit vector register 17 are added in an adder 18. The result of this addition is located into a boundary candidate register 19.

Illustrating the circuit operation of FIG. 14 in connection with FIGS. 12 and 13, the content of the center point register 16 is equal to the coordinate values of the picture cell PE1 at the beginning of the boundary following. The unit vector register 17 has the coordinate value which is added to the coordinate value of PE1 in order to change the coordinate value thereof to that of d1. Therefore, the boundary candidate register 19 is set to have the difference between the coordinate values of PE1 and d1. Then the content of the boundary candidate register 19 is transferred to both a X and a Y address registers 20 and 21. The content of the memory means 1, which is specified by the X and Y addresses of the X and the Y registers, is read into picture data register 22. The picture cell information from the picture data register 22 is fed to a candidate intensity register 23, the content of which and the content of the boundary flag intensity register 15 are compared in a comparator 24. The comparator 24 outputs a control signal s1 in accordance with the compared result. In the case where the contents of the candidate intensity register 23 and the boundary intensity register 15 differ, the contents of the boundary candidate register 19 are transferred to the neighboring point register 25 and the final point register 14 are compared in the comparator 26. However, at the beginning of the boundary following, the above contents are identical so that the above mentioned comparison is not performed. The comparator 26 generates a control signal s2 depending on the compared result. If the contents of the registers 25 and 14 are identical, the boundary tracing is terminated according to the control signal s2. On the other hand, when the contents are found to differ after the comparison, the contents of the unit vector register 17 is changed by an operational circuit 27 so as to shift the currently considered tracing neighbor to the next one such as d2 of FIG. 12. This changed contents of both the unit vector register 17 and the center point register 16 are added, and the result of the addition is set to the boundary point candidate register 19. Thereafter, as is previously described, the picture cell information is read out from the memory means 1 and then the intensity comparison is implemented. When the contents of the candidate intensity register 23 and the boundary intensity register 15 are identical, it means that the next neighboring boundary point has been searched by the boundary following. In this case, the contents of the boundary point candidate register 19 is transferred via a coordinate register 28 to memory means 8, and at the same time also to the center point register 16. The content of the boundary counter 29 is fed to the address register 30 whose contents indicates the address of the memory means 8. The content of the boundary point counter 29 is added by a plus one [+1] counter 31 every time the counter 29 stores one coordinate value of the boundary point. The specification of base address of the memory means 1 and 8 was omitted for clarity of illustration. Likewise, the specification of the base address with respect to the other units of this invention will not be referred to by the same reason.

Thus, the boundary following is carried out as mentioned above and the coordinate values of each boundary point traced is stored in the memory means 8 in sequence.

In the case where the closed boundary of the white region within a black closed boundary is traced, a white discrimination flag is set at the boundary intensity register 15. When the boundary following is further performed inside a closed boundary, information is read from the memory means 12 (FIG. 10), which information indicates whether the picture cell information derived from the memory means 1 is inside or outside the outer closed boundary already traced. The above information is fed to the candidate intensity register 23 as a discrimination signal s3 in order to compare the contents of the registers 15 and 23 in the comparator 24.

Figure 15:
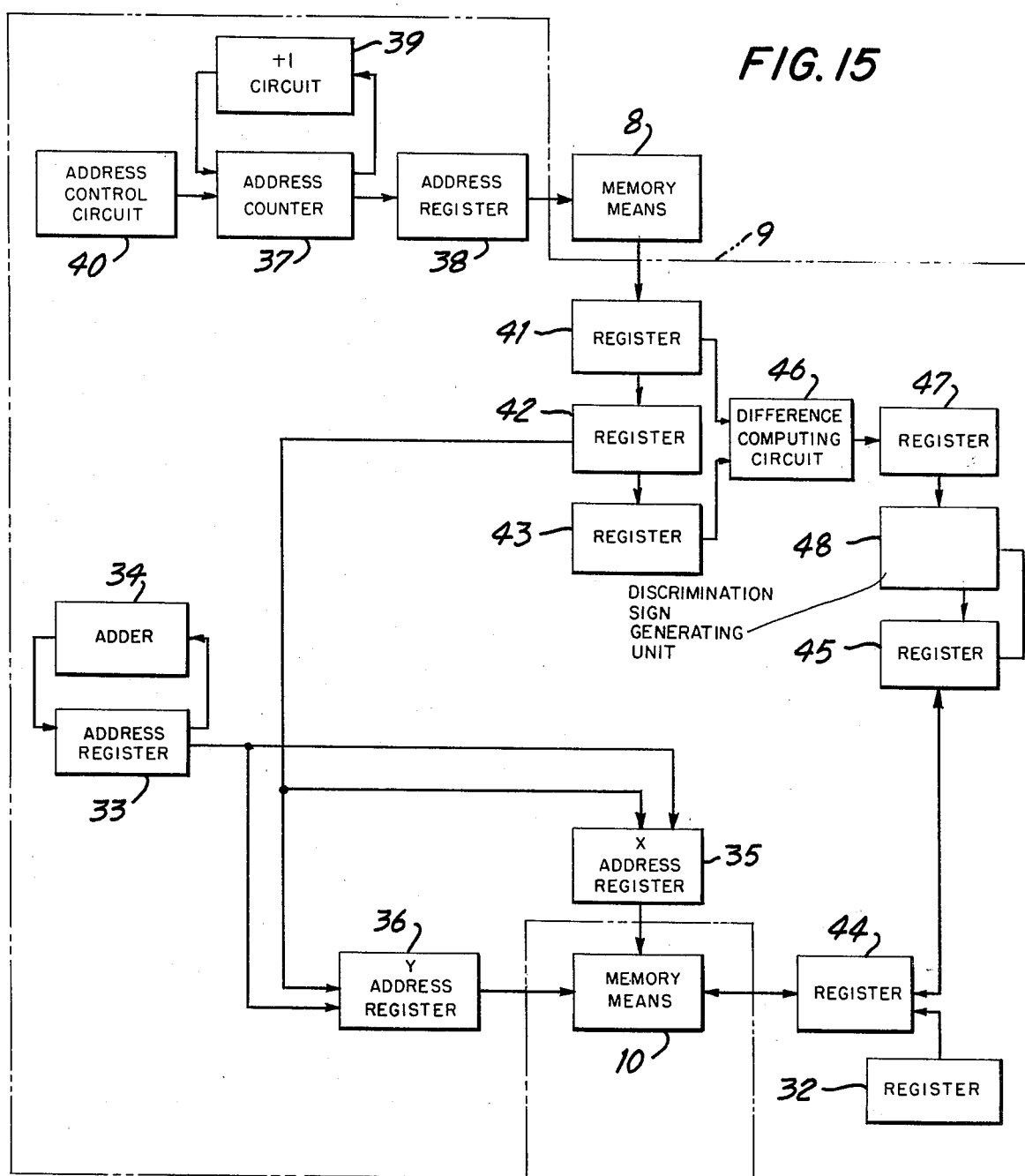
FIG. 15 is a block diagram exemplifying an embodiment of the topological information generating circuit.

FIG. 15 illustrates one example of the discrimination sign generating circuit 9. In FIG. 15, first, the non-boundary signal "−2" is put in a register 32. Then, the content of an address resistor 33 is fed to X and Y address registers 35 and 36 while being changed by an adder 34, in order that the sign "−2" may be written in all the memory positions of the memory means 10. Thereafter, the content of an address counter 37 is transferred to an address register 38 the content of which is used to specify the address in the memory 8 for sequentially reading out X and Y coordinate values of the boundary point. Into the address counter 37 are initially written the address of the coordinate values $X_N$ and $Y_N$ of the final binary point, and then are written the address of the initial boundary point. Thereafter the content of the address counter 37 is sequentially renewed under control of the plus-one circuit 39. When the address of the coordinate values of a boundary point under consideration reaches that of the final binary point, the contents of the address counter 37 is set to the initial binary point address, and the reading out will be terminated after completion of the reading out from the memory means 8. This procedure is done by the address control via storing the final point address in the address control circuit 40, verifying the contents of the address counter 37 in the control circuit 40, and writing the address into the address register 38, etc. The X and Y coordinate values of each binary point, which is read out from the memory means 8, is shifted and transferred to registers 41, 42 and 43 in sequence. The second boundary point coordinate values of sequential groups of three boundary points stored in the register 42 are transferred to the X and the Y address registers 35 and 36, and the discrimination sign stored in the memory device 10 is read out into a register 45 through a register 44. The difference between the Y coordinate values of the preceding and next boundary points, which are respectively stored in the registers 41 and 43, is computed in a difference computing circuit 46. The difference sign, which indicates a positive or negative value, or zero, is stored in the register 47. A discrimination sign generating circuit 48 produces a discrimination sign based on the contents of the registers 45 and 47. This discrimination sign is again written into the register 45 and then into the memory means 10 through the register 44.

As previously referred to in connection with FIG. 8, the difference computing circuit 46 generates the sign "+1" if the Y coordinate value written into the register 43 (viz., the Y coordinate value of the preceding boundary point) exceeds the Y coordinate value written into the register 41 (viz., the Y coordinate value of the next boundary point), and generates the sign "−1" if less and the sign "0" if identical. The circuit for performing the above operations can be constructed by using conventional electronic computer techniques.

The discrimination sign generating unit 48 produces the following signs in consideration of the relation between the output of the register 47 and the output of the memory means 10, through the register 45;

(1) if the output of the register 45 is "−2", this means that a boundary point under consideration is first searched and ignored. In this case, the output of the register 47 becomes a discrimination sign;

(2) if either of the outputs of the registers 45 and 47 is "−1", then "−1" becomes a discrimination sign, regardless of the other sign, in order to indicate that the scanning exits from the closed boundary at a boundary point under consideration when scanned left-to-right; and (3) if neither of the outputs of the registers 45 and 47 is "−1" and at the same time either one of them is "+1", then "+1" becomes a discrimination sign in order to indicate that the scanning enters the closed boundary at a boundary point under consideration.

Figure 16:
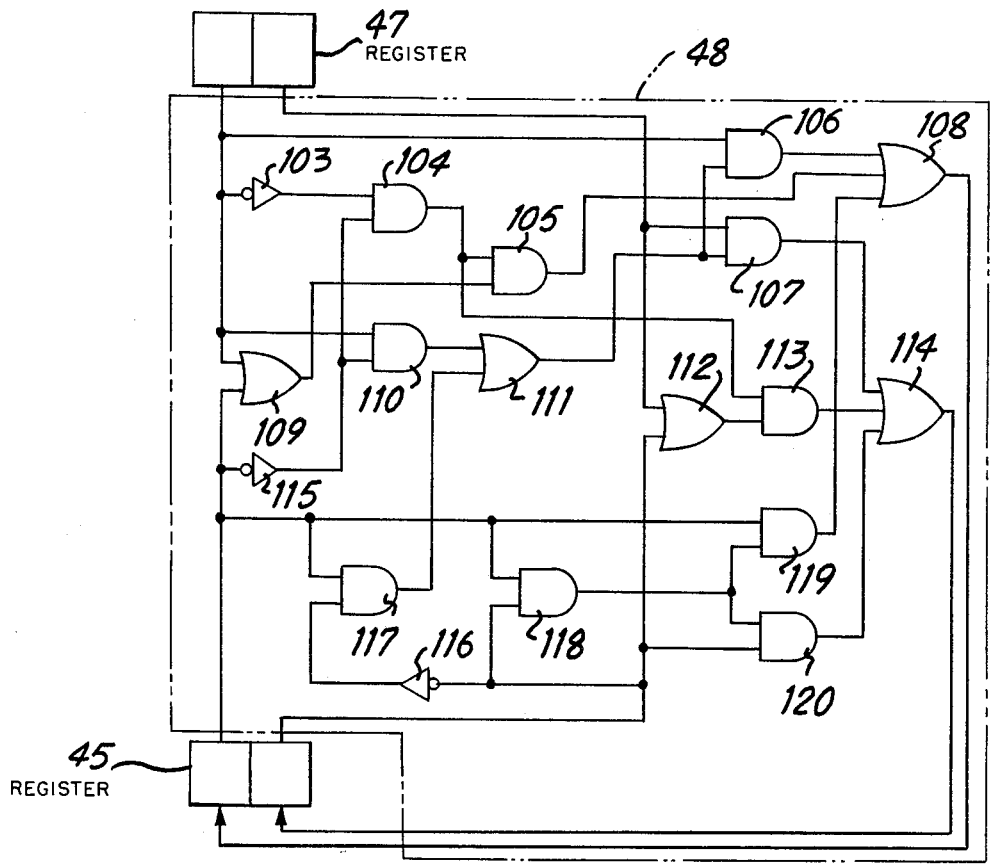
FIG. 16 is a block diagram exemplifying an embodiment of the control signal generating circuit incorporated in the topological information generator.

FIG. 16 illustrates one embodiment of the discrimination sign generating circuit. In FIG. 15, each of the connections between the circuits is denoted by signal line for simplicity. However in actual practice the outputs of the registers 45 and 47 are represented by two bit binary notations thus enabling the use of flip flops for the registers 45 and 47. Hence the signs "0", "+1", "−1" and "−2" are denoted by binary codes "00", "01", "11" and "10", respectively.

When the discrimination sign is produced, it is required to determine that the rightward scanning exits from the closed boundary in order to exactly discriminate the inside and outside regions. To this end, the control sign "−1" is written in the highest priority. There is a case where the sign "−1" occurs together with the other discrimination signals and/or nonboundary sign "2" at the same boundary point such as Pm in FIG. 8. Assuming that a straight cell line is considered as a closed boundary. Then, if one side of the cell line is traced, the discrimination sign is "+1", and while if the other side is traced the discrimination sign will be the other sign, namely, "−1". If neither of the outputs of the registers 45 and 47 is "−1", the sign "+1" or "0" is written as a discrimination sign for indicating that the rightward scanning has encountered a protrusion of the closed boundary defined by a single cell.

In FIG. 16, an inverter 116 and an AND circuit 117 serve to detect that the content of the register 45 is "−2". The output of the AND circuit 117 is fed to two AND circuits 106 and 107 by way of an OR circuit 111, and the controls then storing of the content of the register 47 into the register 45 through OR circuits 108 and 114. An AND circuit 118 detects that the content of the register 45 is "−1". The output of the AND circuit 118 is supplied to AND circuits 119 and 120, and controls the storing of the content of the register 45 into the register 45 through the OR circuits 108 and 114. An inverter 115 detects whether the content of the register 45 is "0" or "+1". An AND circuit 110 detects that the content of the register 47 is "−1" and simultaneously the content of the register 45 is "0" or "+1". The output of the AND circuit 110 is applied through the OR circuit 111 to the AND circuits 106 and 107, and controls, through the OR gates 108 and 114, such that if the content of the register 47 is "−1", this sign "−1" is stored into the register 45. An inverter 103 detects whether the content of the register 45 is "0" or "+1". An AND circuit detects that the content of the register 47 is not "−1" and at the same time the content of the register 45 is neither of "−1" and "−2". The output of the AND circuit 104 is fed to AND circuits 105 and 113, and controls the storing of results computed from the upper and lower bits of both the registers 45 and 47 into the register 45 via the OR circuits 108 and 111. The above-captioned result is obtained by using the OR circuits 109 and 112.

Figure 17:
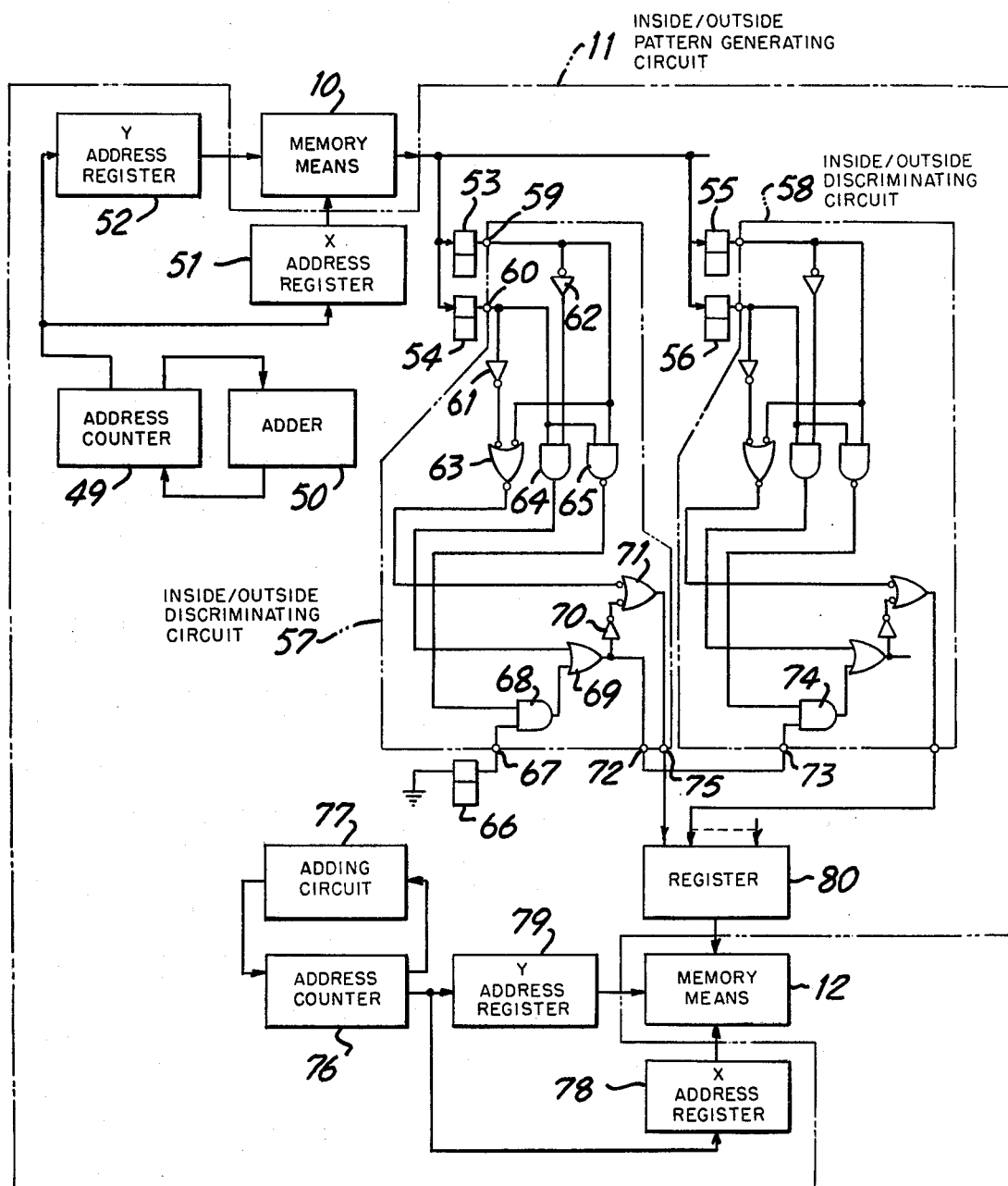
FIG. 17 is a block diagram exemplifying an embodiment of the Inside/Outside discrimination circuit.

FIG. 17 illustrates one embodiment of the Inside/Outside pattern generating circuit 11. The content of an address counter 49 is renewed by an adder 50. The renewed content is applied to X and Y address registers 51 and 52, specifying the address of the memory means 10 for reading the discrimination sign from that corresponding to the leftmost picture cell, then this sequentially derived discrimination sign is applied to flip-flops 53, 54 and also to flip-flops 55, 56 in sequential order. More specifically, the flip-flops 53 and 55 are supplied with upper bits of each discrimination sign, whilst the flip-flops 54 and 56 are supplied with the lower bits of each discrimination sign.

The pair of the topological information memory flip-flops [53, 54] and [55,56] are respectively followed by Inside/Outside discrimination circuits 57 and 58 whose circuit configuration are identical. Therefore description of the other pairs of flip-flops as well as their corresponding Inside/Outside discrimination circuits which belong to the 3rd and subsequent stages will be omitted for clarity.

The output terminals of the flip-flops 53 and 54 are connected through terminals 59 and 60, to inverters 62 and 61, an OR circuit 63, an AND circuit 64 and a NAND circuit 65, which are included within the Inside/Outside discrimination circuit 57 and 58 and which constitute a logic circuit. The output of the OR circuit 63 indicates L [Low level active] as a CHK signal if the discrimination sign indicates a sign other than "−2". On the other hand, the AND circuit 64 produces, at its output, H [High level active] as an ON signal if the discrimination sign is "+1". Finally, the NAND circuit 65 indicates, at its output, H as an OFF signal in the case where the discrimination sign is "−1".

A "CARRY" flip-flop 66 is provided for generating a "CARRY" signal, but, in this embodiment, is always maintained in a reset condition, because the Inside/Outside discrimination circuit 57 is positioned at the leftmost stage, and because the "CARRY" signal applied to the leftmost stage corresponds to a "CARRY" signal for using the least significant bit in arithmetic adding. The Inside/Outside discrimination circuit 57 is supplied with the "CARRY" signal from the flip-flop 66 via a "CARRY" input terminal 67. The output terminals of the "CARRY" input circuit, the OR circuit 63, the AND circuit 64 and the NAND circuit 65 are connected to a logic circuit which consists of the AND circuit 68, the OR circuit 69, an inverter 70 and the OR circuit 71. The OR circuit 71 produces at its output the Inside/Outside discrimination information of the first stage as "RESULT" signal. The OR circuit 69 produces a "CARRY" signal to be fed to the next stage. This "CARRY" signal is applied to a "CARRY" input terminal 73 of the Inside/Outside discrimination circuit 58 through a "CARRY" output terminal 72, and then transferred to one input of an AND circuit 74 of the circuit 58. In the second stage, the same discrimination as in the first stage is carried out, and thereafter a "CARRY" signal is fed to the third stage. The same proceedure as above is performed in each subsequent stage for the Inside/Outside discrimination.

The result of the discrimination at each stage is represented by the following:

RESULT = CHK + CARRY$_N$

CARRY$_N$ = ON + OFF·CARRY$_{N-1}$ where "CARRY" indicates a "CARRY" signal under consideration, and "CARRY$_{N-1}$" indicates a "CARRY" signal at a preceeding stage. The Inside/Outside discrimination circuit 57 of each stage produces a "RESULT" signal which assumes "1" if the picture cell is inside the closed boundary and assumes "0" if outside, as previously discussed in connection with FIG. 8. As for the Inside/Outside discrimination circuit 57, the "RESULT" signal is generated from a terminal 75. This "RESULT" signal is written into the memory means 12 as an inside/outside pattern.

The content of an address counter 76 is renewed by an adding circuit 77, and then is written into X and Y address registers 78 and 79 in order to specify the positions in a register 80, to which position each "RESULT" signal is to be located. Thus, when the stored position is decided, each "RESULT" signal is memoried within the register 80.

Figures 18A, 18B, 18C, 18D:
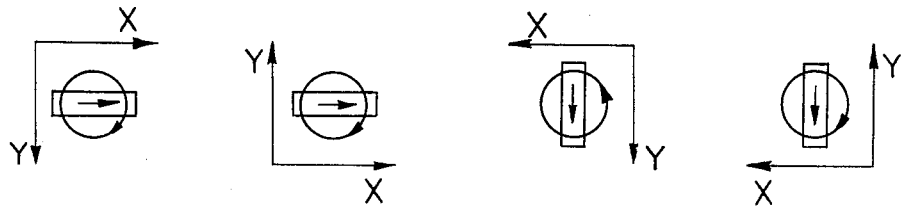
FIGS. 18(a) through (d) are schematic drawings for illustrating the examples of other boundary followings with different tracing directions, etc.

In the aforementioned embodiments, the direction of the X and Y axes etc. are decided as shown in FIG. 18[a]More specifically, the boundary following traces a circular path as indicated by the circle in the figure and in the direction of the arrow on said circle, the orientation of the picture cell line is indicated by the rectangle superimposed on the circle while the scanning direction is indicated by the arrow within the rectangle. However the directions of the X and Y axes, the boundary following and the directions of the picture cell line to be scanned [i.e. picture cell row or column] are not restricted to those of FIG. 18[a] and many combinations as shown in FIGS. 18[b], [c] and [d] for example are possible. Nevertheless, in all cases a control sign assumes "+1" if the picture cell scanning line enters a closed region, and assumes a "−1" upon the scanning line exiting from the closed region.

FIG. 19, illustrates one embodiment of a memory means which is especially useful for implementing the method according to the present invention. In determining whether a region of a given picture is outside or inside a closed boundary, it is highly advantageous if two kinds of bits indicating the intensity and inside/outside information of one picture cell can be independently read and written. The memory means as shown in FIG. 19 accomodates the aforementioned memory means 1,10 and 12 in one unit, and is able to read and write one kind of bit regardless of the other.

In FIG. 19, memory means 81 is an IC [Integrated Circuit] memory. Into X-Y address register 82, which is located in a suitable apparatus provided to read/write the data stored in the memory means 81, is written a memory address of picture cell information to be read or written. Each of decoders 83,84 and 85 discriminates whether the address specification is for memory position associated therewith. A bit pattern register 86 determines which bit pattern of an operational register a read/write bit belongs to, wherein the bit pattern corresponds to intensity information, inside/outside information or another information of a picture cell. A decoder circuit 87, which decodes the content of the bit pattern register 86, is provided with memory means 81. Let us now consider that the content of the memory address register 82 specifies a stored position of the decoder 83. Then, the outputs from the decoder 83 and 87 are applied to the AND circuits 91,92 and 93 which are connected to "ENABLE" terminals of bit memory elements 88,89 and 90, respectively. A read/write instruction register 94 is supplied with data for discriminating whether a stored content should be read or information should be written. Then, based on the output of the read/write construction register 94, a read/write operation is carried out with respect to memory means connected to a specified AND circuit which has performed a logical product of the outputs of the decoders 83 and 87. Data from each memory means is written into a register 98 through lines 95,96 and 97. Whilst, writing into each memory means is carried out by transferring the data located in a register 99 by way of lines 100, 101 and 102.

In as much as the memory means 81 is an IC memory, it can incorporate logic circuits. As for example, the Inside/Outside discrimination circuit shown in FIG. 17 can be combined into the memory means 81. Therefore, cumbersome procedures can be avoided that the information derived from the memory means 12 is again applied to the memory means after given electrical treatment or procedure.

If the Inside/Outside discrimination circuit 57 is installed in the memory means or device 81, the circuit 57 is provided using the logical elements of the memory device 81. In this case, data reading lines, which correspond to discrimination sign bits of the memory device 81, are connected to the terminals 59 and 60 of the discrimination circuit 57, and the terminal 72 for the "RESULT" output is connected to a data writing line corresponding to any one of the discrimination sign bits, wherein a portion of the discrimination sign bits are replaced by the inside/outside pattern bit. Due to the above modification, the address specifying circuits of the memory device as shown in FIG. 17 can be accommodated in a single unit, and the memory capacity can be reduced, and furthermore the processing time can be shortened. In the above modification, the "CARRY" signal output terminal of the Inside/Outside discrimination circuit of each stage is connected the input terminal of the "CARRY" signal of the Inside/Outside discrimination circuit of the next stage, wherein the discrimination circuit of the first stage should be maintained to receive reset signal.

Figure 20:
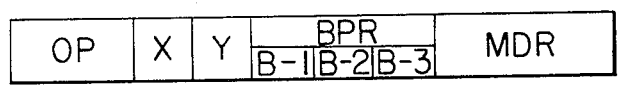
FIG. 20 is a schematic drawing of an instruction format of an electronic computer using the memory device of FIG. 19.

FIG. 20 illustrates one example of instruction codes of an electronic computer in the case where the memory device 81 as shown in FIG. 19 is used. An "OP" part of FIG. 20 instructs the read/write operations, and X and Y parts are for specifying picture cell position which is located into the memory address register 82 of FIG. 18. B-1, B-2 and B-3 sections of "BPR" part specify the bit patterns. More specifically, the B-1 section is for specifying intensity of a picture cell, the B-2 for specifying the discrimination sign bits, and the B-3 section for specifying the other picture cell data bits. A "MDR" defines the content of the data to be written, and also is used to store the contents being read out from the memory device. for determining the read or the write operation in accordance with the "OP" part is located into a discrimination register 94 of FIG. 19, and the bit pattern specifying data block of the "BPR" part is located into the bit pattern register 86 of FIG. 19. When the read operation is instructed by the "OP" part, the content in the "read" register 98 is written into the "MRD" part. On the other hand, when the write operation is instructed by the "OP" part, the content of the "MDR" part is transferred to the memory element specified via the "write" register 99 of FIG. 19. If the memory device as shown in FIG. 19 is provided, the bit pattern can be specified and written with respect to each memory unit which stores a plurality of bits of the memory device, and also the bits can be independently read or written, by use of such instruction as shown in FIG. 20.

We claim:

1. A method of determining whether or not a picture cell of a given picture is within a closed boundary, comprising the following steps:
scanning the given picture to store picture cell data thereof into memory positions of a first memory device;

storing non-boundary signs into memory positions of a second memory device, wherein non-boundary signs each indicates that the corresponding picture cell is not located on the closed boundary of the given picture, and wherein said memory positions of said second memory device correspond to the memory positions, filled by the picture cell data, of said first memory respectively;

following the picture cell data, which are representative of the picture cells on the closed boundary respectively, along a predetermined direction to obtain coordinate values of the boundary picture cell data;

comparing coordinate values of a preceding and next successive boundary picture cell data of each boundary picture cell data along one coordinate axis, developing discrimination signs each indicative of increasing, decreasing or lack of change of the compared coordinate values, writing the discrimination signs into said second memory device at the memory positions corresponding to the picture cells on the closed boundary; and checking the discrimination signs along the other coordinate axis, which intersects said one coordinate axis, to determine whether each of the non-boundary signs corresponds to picture cell data inside or outside of the closed boundary.

* * * * *